March 22, 1927. 1,621,529
J. L. FITTS ET AL
APPARATUS FOR WITHDRAWING WATER OF CONDENSATION AND GASES
ENTRAINED THEREWITH FROM STEAM HEATING SYSTEMS
Filed June 20, 1923 5 Sheets-Sheet 1

Inventors:
J. L. Fitts
and K. W. Rohlin,
By Murray Boyd
Attorney.

Patented Mar. 22, 1927.

1,621,529

UNITED STATES PATENT OFFICE.

JAMES LOGAN FITTS, OF MERCHANTVILLE, NEW JERSEY, AND KARL W. ROHLIN, OF PHILADELPHIA, PENNSYLVANIA, ASSIGNORS TO WARREN WEBSTER & COMPANY, OF CAMDEN, NEW JERSEY, A CORPORATION OF NEW JERSEY.

APPARATUS FOR WITHDRAWING WATER OF CONDENSATION AND GASES ENTRAINED THEREWITH FROM STEAM HEATING SYSTEMS.

Application filed June 20, 1923. Serial No. 646,554.

Our invention relates to steam or vapor heating systems operating under a vacuum, and the principal object of our invention is to provide efficient means for returning condensed water vapor from a heating system return line to the boiler from which it was evaporated, and to exhaust from the return line condensible and non-condensible gases while maintaining the desired vacuum in such return line.

A further object of our invention is to provide means whereby the pressure of the gas or air removed from the system may be increased from any pressure below that of the atmosphere and discharged from the system at or above atmospheric pressure.

A further object of our invention is to provide an improved form of turbo-blower for increasing the pressure of the gas or air in order that the latter may be removed from the system.

A further object of our invention is to provide means whereby the number of rotors of the turbo-blower structure necessary for effective operation to raise the pressure of the air or gas to the desired point can be increased or cut down as desired.

A further object of our invention is to provide a combined structure with which the return line of the heating system is connected whereby the water of condensation may be delivered to a suitable receiver and from such point returned to the boiler, preferably by means of a centrifugal pump; the entrained gas and air being first passed through a suitable radiator to reduce the temperature and then delivered to the turbo-blower whereby the pressure is raised to that of the atmosphere for discharge thereto.

And a still further object of our invention is to provide apparatus of varied type capable of efficiently carrying out the work proposed, and in this connection, we may use a turbo-blower having rotors mounted upon a horizontal shaft, motor driven, with a centrifugal pump for delivering the water to the boiler also driven by a motor, (either by the motor which drives the turbo-blower shaft through suitable belt or gear connection, or by an independent motor properly proportioned as to speed with respect to the motor which drives the shaft of the turbo-blower); or we may use a type of turbo-blower with rotors mounted upon a vertical, motor driven shaft, which also drives the centrifugal pump.

In the modern heating system practice, it is often desirable to use a motor driven vacuum pump when a low pressure boiler, inadequate for operating a steam driven pump, is installed.

The structure forming the subject of our invention is essentially a high speed apparatus capable of direct connection to a motor, such apparatus containing no pistons, or provision for water plugs or valves of any character, no stuffing boxes, except for the centrifugal water pump, and no rubbing parts except the shaft and the bearings in which it is mounted. It will be seen, therefore, that no power is expended in circulating water; in the formation of water pistons, or in friction due to tight stuffing boxes. The structure forming the subject of our invention comprises three essential elements, a prime mover (one or more motors), a centrifugal water pump, and a centrifugal compressor, or turbo-blower.

These and other features of our invention are more fully described hereinafter, reference being had to the accompanying drawings, in which.

Figure 1:
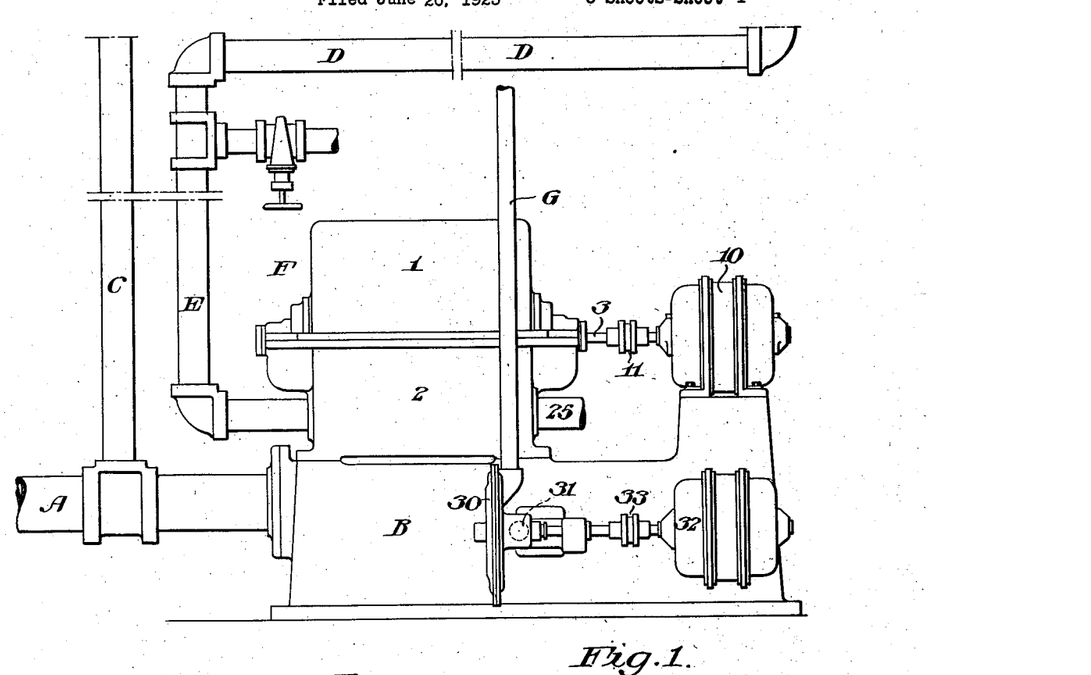
Figure 1, is a view in elevation largely diagrammatic, of one form of operating mechanism within the scope of our invention.

In Fig. 1 of the drawings, A represents the return line from a steam or vapor heating system, and in this type of our improved apparatus, this return line is connected with a receiver B, which may be in the form of a hollow shell forming a base support for other mechanism hereinafter described, and serving to receive the water of condensation from such return line A. A pipe C leads from the return line A to a suitable condensing coil D, such pipe C receiving and conveying to such condenser or radiator the gases and air entrained with the vapor or steam accompanying the water of condensation flowing through the return line. For all practical purposes, the condenser may be in the form of an ordinary pipe radiator, a portion of which is indicated in Fig. 1, and the air and gases separated from the entrained moisture pass from the same through a pipe E to a turbo-blower or centrifugal compressor F, (hereinafter referred to as a "turbo-blower").

The turbo-blower may be mounted directly over the receiver for the water of condensation, as shown in Fig. 1, and in the present instance such turbo-blower comprises a suitable shell or casing which may be made in half sections, 1 and 2, bolted together on a horizontal line; preferably in the plane of the longitudinal axis of a shaft 3, passing through the same. The interior of the turbo-blower, whose chamber is substantially circular in cross section, is divided into a series of annular compartments 5, which are disposed side by side and extend from end to end of the structure.

Figure 3:
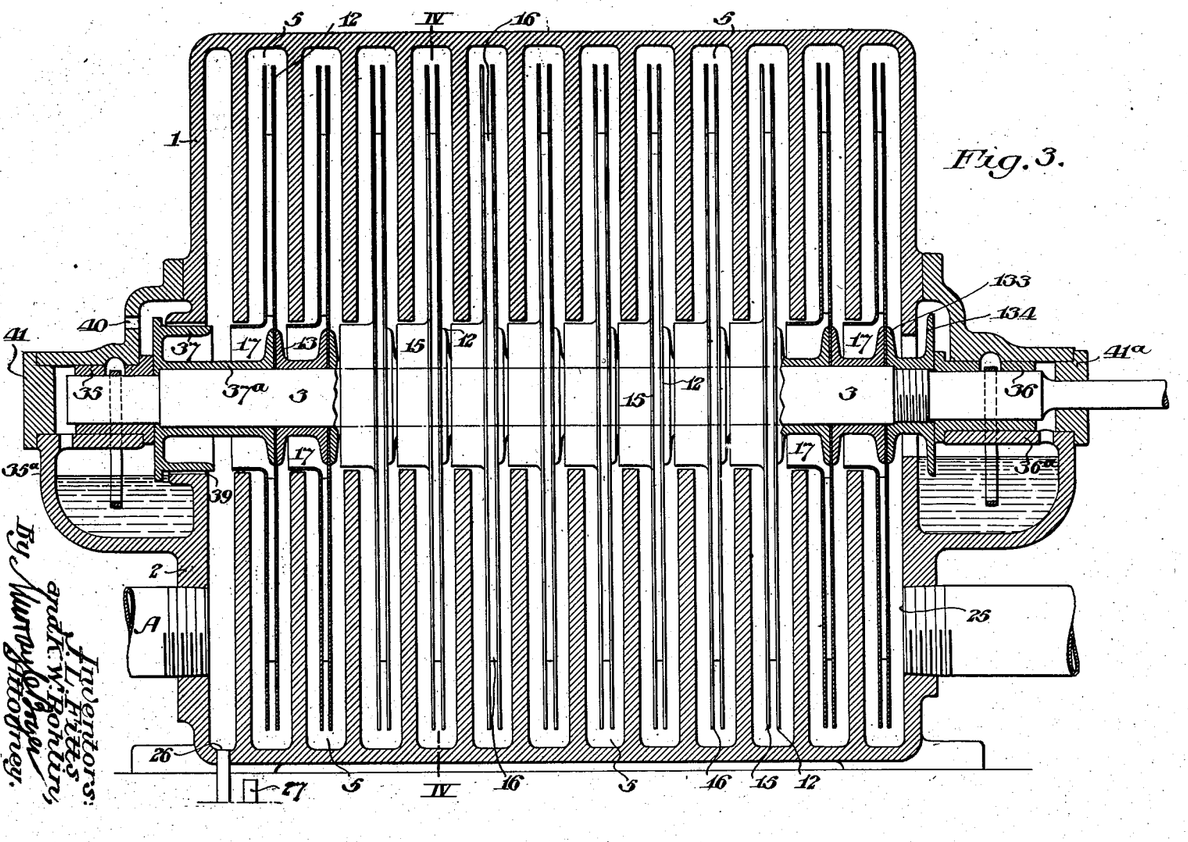
Fig. 3, is a longitudinal sectional view, on an enlarged scale, of the turbo-blower or centrifugal compressor employed with the structure shown in Fig. 1.
Figure 4:
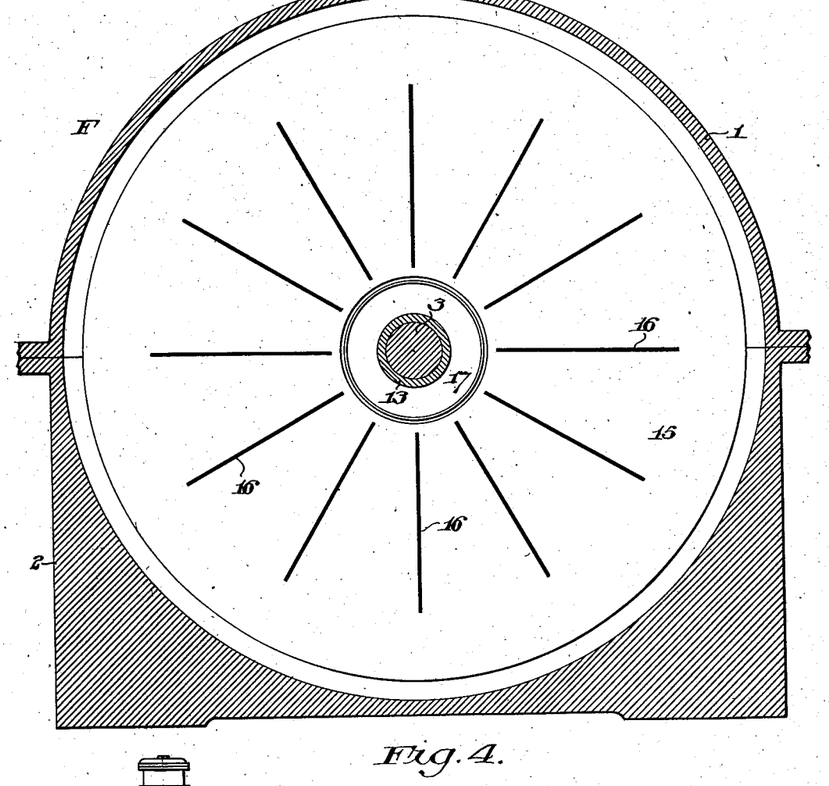
Fig. 4, is a cross-sectional view of the turbo-blower, taken on the line IV—IV, Fig. 3.

Carried by the shaft 3 of the turbo-blower, which is connected to and may be rotated by a suitable high speed motor indicated at 10, suitably coupled to the shaft 3, as indicated at 11, are a series of disks 12, preferably made of relatively thin sheet metal, and suitably secured to hubs 13, fixed to said shaft 3. Other disks 15, which are spaced from and connected to said disks 12 by means of radially disposed bars or vanes 16, and to which both disks may be secured by suitable rivets or the like form, with said disks 12, turbine rotors or impellers (hereinafter referred to as "rotors"), each having an opening 17, surrounding the shaft 3 at one side, whereby the air and/or gases from the return line of the heating system entering the chamber of the turbo-blower via the pipe E, and from each stage of said turbo-blower, may pass to the interior of said rotors for discharge from the peripheral edge thereof. The diameter of the disks forming these rotors is such that sufficient space is left between their outer edges and the annular wall of the compartments 5 of the turbo-blower to permit the air and/or gases to escape from one rotor to the next stage of the turbo-blower for entrance, via opening 17, to the next rotor, and so on.

Rotation of the shaft 3, causes the rotors carried thereby to impart centrifugal force to the entering gases and entrapped air and build up a pressure at the peripheral margin of said disks where the air and gas is successively discharged; such pressure increasing as it is passed through the several stages of the turbo-blower and building up to an extent sufficient to permit delivery of the gases and entrapped air at atmospheric or greater pressure at the discharge end of the turbo-blower; such gases and air finding their exit through an exhaust opening 25, which may connect with a suitable pipe or flue leading to the exterior of the building in which the structure is erected. Any water of condensation which may carry over from the condenser will enter the first chamber of the turbo-blower, and a suitable outlet 26 may be provided to discharge such water, including a trap connection 27, whereby it will be delivered to the receiver B.

In order that the water of condensation may be delivered from the receiver B to a boiler, wherever the latter may be disposed, we preferably provide a centrifugal pump 30, operatively connected to such receiver B by providing the latter with an outlet port 31 with which the inlet port of the pump casing is in registry for direct connection; such water passing to the boiler via a pipe G. The centrifugal pump 30 may be driven by a suitable motor 32, the shaft of such pump being connected to the motor shaft by a coupling 33, of any ordinary type, similar to that shown for connecting the shaft 3 of the turbo-blower with the shaft of the motor 10. The motor 32 for driving the centrifugal pump may be operated at a speed substantially half that of the motor that drives the turbo-blower. In some instances, it may be desirable to drive the pump from the shaft of the motor 10, and this may be effected through suitable belt or chain connections with properly proportioned pulleys or sprocket wheels, or proper reducing gearing, interposed between the motor shaft and the pump shaft.

As may be readily understood, the shaft 3 of the turbo-blower structure illustrated in Fig. 3, is subject to considerable end thrust in the direction of the arrow a. The ends of the shaft 3 are mounted in suitable bearing bushings 35 and 36, confined in suitable boxes 35ª and 36ª, carried by the ends of the turbo-blower casing. At the left hand side of the structure, as illustrated in Fig. 3, we provide what may be termed a piston element 37, which may be carried by a sleeve 37ª, fixed to the shaft 3, and having a working fit in a flanged opening 38, formed in the end wall of the turbo-blower casing; the outer face of such piston 37 being nominally in contact with the end of the bushing 35. When the structure is in operation, such thrust face will be lubricated by oil raised by the oiling ring 39 and flowing along the surface of the shaft; any surplus being thrown off by the rotating piston and gravitating to the lubricant supply in the box 35ª. In order that the end thrust may be minimized as much as possible, the wall of the turbo-blower casing above the oil reservoir is apertured at 40 to admit atmospheric pressure, and such pressure may act upon the exposed face of the piston 37.

At the opposite end of the turbo-blower casing, the flange 133 which secures the disk 12 of the last rotor in place is preferably threaded onto a shouldered portion of the shaft 3, and is provided with a flange 134, nominally in contact with the end of the bushing 36; such flange also serving to divert and discharge from its edge any oil leaking past the bushing toward the rotors. The journal-box 35ª at the left hand side of the turbo-blower casing, as illustrated in Fig. 3, is preferably closed by a plug 41, while a plug 41ª, similarly employed at the right hand side of such casing is apertured for the passage of the shaft extension which is operatively connected to the high speed motor 10.

Figure 2:
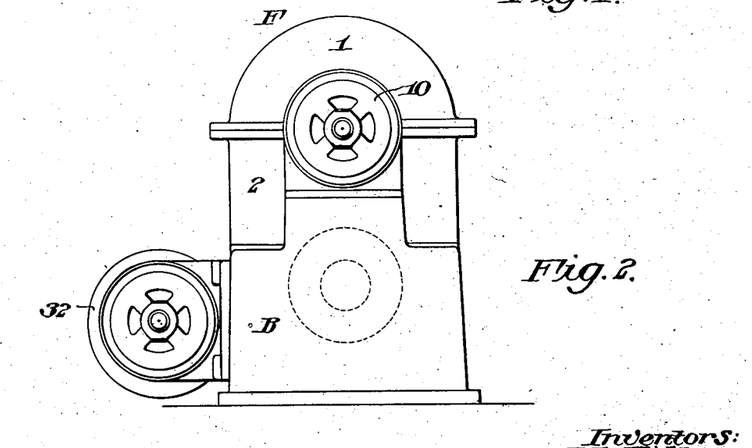
Fig. 2, is an end view of the structure shown in Fig. 1.

The structure illustrated in Figs. 1, 2 and 3, employs a turbo-blower having rotors mounted upon a horizontal shaft. It will be understood, however, that a turbo-blower structure in which the rotors are mounted upon a vertical axis may be employed, and apparatus of this type is illustrated in Figs. 5, 6 and 7.

Figure 5:
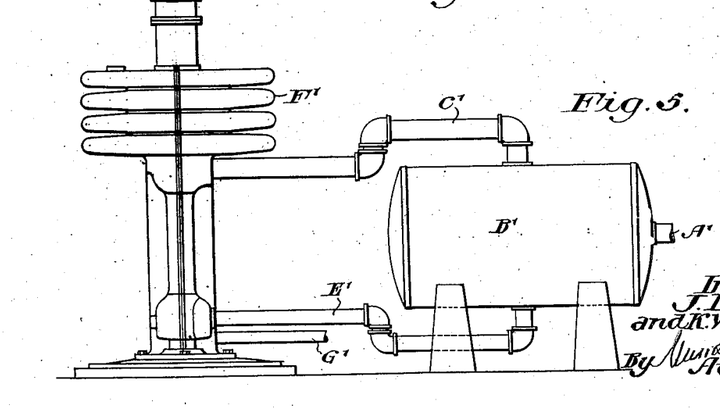
Fig. 5, is a view in elevation, largely diagrammatic, of another arrangement within the scope of our invention, in which the turbo-blower is mounted vertically.
Figure 6:
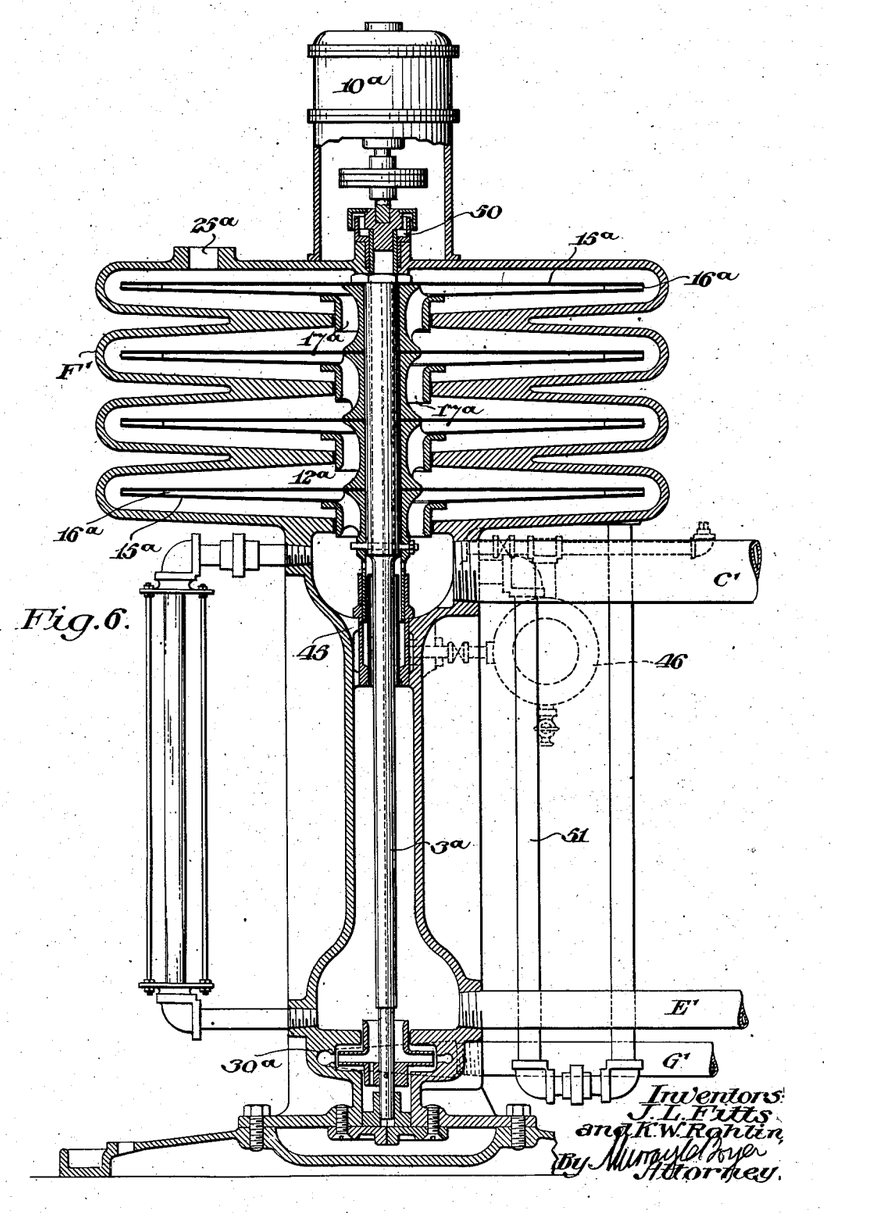
Fig. 6 is a vertical section of the turbo-blower and associated mechanism of the form of structure shown in Fig. 5, and Fig. 7, is a view similar to Fig. 6, illustrating a further modification within the scope of our invention, in which the turbo-blower is also mounted vertically, directly over a receiver for the water of condensation from the return line.
Figure 7:
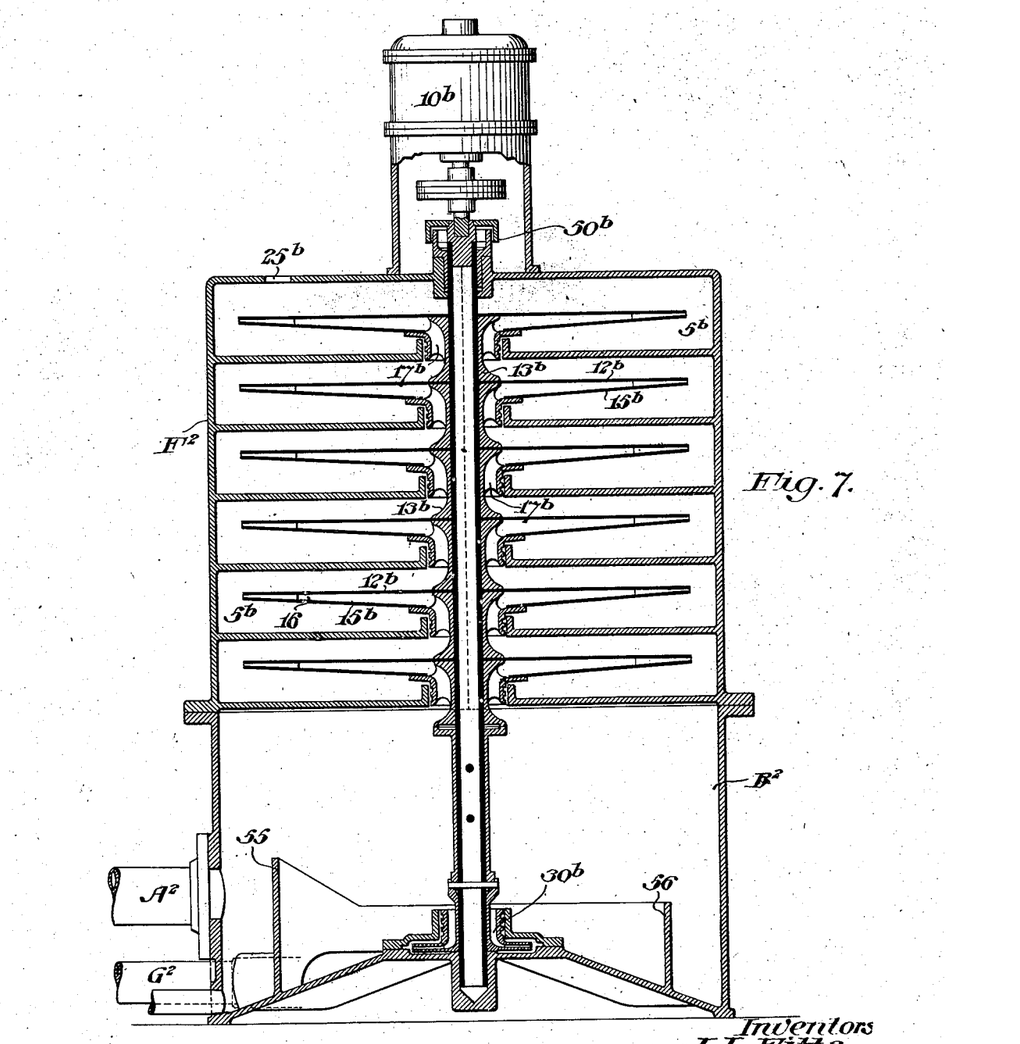

In Fig. 5, we have illustrated diagrammatically, a structure employing a turbo-blower of the vertical type, and in Fig. 6, a sectional elevation of the turbo-blower is shown. In this form of structure the centrifugal water pump 30ª, as illustrated in Fig. 6, is the lowest rotating member, and may be of the single inlet, enclosed impeller, volute casing, type; with the eye of the pump opening upwardly to vent the impeller of air, gases, etc. The pump is carried by a shaft 3ª, and a guide bearing 45, therefor, flooded with oil, is disposed directly above the centrifugal pump; an external oil-receiving chamber 46, suitably supported by the casing of the structure, being in communication with such guide bearing.

In this type of structure, a receiver B', in communication with a return line A', is connected to the pump structure by pipes C' and E', the pipe C' carrying to the turbo-blower any entrained air or gas entering the receiver from the return line A', which receiver may also serve as a condenser, while the pipe E' discharges the water of condensation to the lower part of the turbo-blower casing directly above the pump 30ª, and from such pump the water may be delivered to the boiler via a pipe G'.

The turbo-blower structure shown in Figs. 5 and 6, is a type of single inlet, enclosed impeller design, and the number of stages are variable to meet the user's needs for a high or low vacuum. In the present instance, the rotors are made up of disks 12ª of relatively thin sheet metal, as in the structure illustrated in Fig. 3, suitably secured to hubs 13ª, which are fixed to the vertical shaft 3ª; such rotors being formed by the disks 12ª and other disks 15ª, which are spaced from and connected to the disks 12ª by means of radially disposed bars or vanes 16ª to which both disks may be secured by suitable means such as rivets or the like. The disks 12ª and 15ª forming the rotors may be slightly concaved toward each other. The rotors, so disposed, are provided with openings 17ª at one side of the same whereby the air and gases from the system initially entering the chamber of the turbo-blower via the pipe C', and from any stage of the turbo-blower, may pass to the interior of the same. In this form of structure, the motor 10ª for the shaft 3ª may be vertically disposed and mounted above the rotor chamber, or a horizontally disposed motor, with suitable gearing, may be employed to drive the shaft 3ª.

As in the structure illustrated in Fig. 3, the rotation of the shaft 3ª, causes the rotors carried thereby to impart centrifugal force to the entering gases and entrapped air and build up a pressure at the peripheral margin of said disks, such pressure increasing as it passes through the several rotors and building up to an extent sufficient to permit delivery of the gases at atmospheric or greater pressure at the discharge end of the turbo-blower; such gases and air finding their way out through an exhaust opening 25ª. The air and vapor enter the lowest stage, passing through each stage in succession, and then to the atmosphere. In this type of structure, the pressure at the inlet of both pumps is the same, eliminating the need for stuffing boxes. The pressure above the last stage, inside and outside the turbo-blower casing is that of the atmosphere and no stuffing boxes are needed there.

The weight of the rotating parts and the unbalanced end thrust are carried by a ball thrust bearing 50 interposed between the motor and the turbo-blower, such bearing being flooded with oil and amply large enough for the greatest load.

A water seal 51, is provided to carry water slugs and vapor separated out or condensed in the first stage of the turbo-blower inlet and thence to the centrifugal water pump, when the amount of water entering the first stage is greater than that which will leak back in the clearance space around the eye of the first stage of the turbo-blower. In the vertical shaft type of structure, the use of stuffing boxes is eliminated and there is a great saving in floor space.

In the structure illustrated in Fig. 7, the receiver $B^2$ is mounted directly below the turbo-blower, and is directly connected to the return line $A^2$, the water of condensation and entrained air or gas entering the receiver from the return main $A^2$, striking a baffle 55, and overflowing a dam 56 surrounding the pump $30^b$ and submerging the same. The use of a dam provides space for any entrained dirt to settle and avoids passing the same to the pump. From such pump the water may be delivered to the boiler via a pipe $G^2$. The turbo-blower is of the same type as that illustrated in Fig. 6, and the rotors are made up of disks $12^b$ of relatively thin sheet metal, suitably secured to hubs $13^b$, which are fixed to the shaft $3^b$. The disks $12^b$ form, with other disks $15^b$, which are spaced from and connected to the disks $12^b$ by means of radially disposed bars or vanes $16^b$ to which both disks may be secured by suitable means such as rivets or the like, turbine rotors. The disks $12^b$ and $15^b$, may be concaved, as in the structure shown in Fig. 6. The rotors so disposed are provided with opening $17^b$ at one side whereby the air and gases from the heating system initially entering the chamber of the turbo-blower from the receiver $B^2$ or from any stage pass to the interior of the same. As in the form of structure shown in Fig. 6, the motor $10^b$ is vertically disposed and mounted above the turbo-blower.

As in the structure illustrated in Fig. 6, rotation of the shaft $3^b$ will cause the rotors to impart centrifugal force to the entering gases and entrained air and build up a pressure at the peripheral margin of said disks, such pressure increasing as it passes through the several rotors and building up to an extent sufficient to permit delivery of the gases at atmospheric or greater pressure at the discharge end of the turbo-blower, such gases and air finding their way out through an exhaust opening $25^b$. The air and vapor enter the lowest stage, passing through each stage in succession, and then to the atmosphere. The pressure at the inlet of both pumps is the same, eliminating the need for stuffing boxes. The pressure above the last stage inside and outside the turbo-blower casing is that of the atmosphere and no stuffing boxes are needed there.

The weight of the rotating parts and the unbalanced end thrust may be carried by a ball thrust bearing $50^a$ interposed between the motor and the turbo-blower, as in the structure shown in Fig. 6, such bearing being flooded with oil and ample for the greatest load.

The number of compartments in use in any particular turbo-blower structure depends upon the amount of work to be performed by the operation of the same, and in lieu of the construction illustrated the shell of the turbo-blower may be made up of a series of unit sections containing one or more annular compartments or spaces for the rotor or impellers whereby structures varying in size or capacity may be built up as desired, or the structure may have a maximum capacity and where the work to be performed is small, a number of the rotors or impellers may be omitted; the number used in all instances being determined by the amount of work to be performed, and additional rotors or impellers being added when the amount of work to be performed is increased.

The water, vapor, and gases, from the heating system will first enter the receiver $B'$, in the form of structure illustrated in Figs. 5 and 6, which receiver will be a separate unit. In such arrangement, the water flows from the bottom of the receiver to the pump via the pipe $E'$ while the air and gases flow from the top of the receiver to the lowest stage of the turbo-blower via the pipe $C'$; opportunity being taken in this connection, if desired, to cool the gases and condense the vapor, thereby causing an increase in vacuum and efficiency. In the structure shown in Fig. 7, the receiver $B^2$ is disposed directly below the turbo-blower and the return line of the heating system is directly connected thereto, and the inlet stage of the turbo-blower opens directly from said receiver.

In some instances, it may be desirable to operate the system at atmospheric pressure or higher during a part of the day and use the turbo-blower for assisting in exhausting the air and gases from the return line to expedite the heating of the entire system. In such case, in operating a structure such as illustrated in Figs. 1, 2 and 3, the motor for driving the turbo-blower may be at rest with the water pump in operation for delivering to the boiler any water of condensation emptying into the receiver. In such case the entrapped air and gases accompanying such water of condensation may be vented to the atmosphere at a suitable point, and for this purpose, we may provide the return pipe E from the condenser with a valve 60, which may be open to the atmosphere when the turbo-blower is not in use.

We claim:

1. The combination, with the return line of a steam or vapor heating system, of a centrifugal pump in communication with such return line for receiving and returning to the boiler the water of condensation collecting in the return line, and a turbo-blower also in communication with said return line and serving to raise the pressure of the entrained air and gas accompanying the water of condensation from the return line to that of the atmosphere and discharge the same thereto simultaneously with the delivery of the water of condensation to the boiler.

2. The combination, with the return line of a steam or vapor heating system, of a tank in communication with such return line and receiving water of condensation and air and gas entrained therewith, a centrifugal pump in communication with said receiver for returning to the boiler the water of condensation collecting in such return line, and a turbo-blower also in communication with said receiver and serving to raise the pressure of the air and gas accompanying the water of condensation from the return line to that of the atmosphere and discharge the same thereto simultaneously with the delivery of the water of condensation to the boiler.

3. The combination, with the return line of a steam or vapor heating system, of a receiver in communication with such return line and receiving water of condensation, means for separating therefrom the air and gas entrained therewith, a centrifugal pump in communication with said receiver for returning to the boiler the water of condensation collecting in said return line, and a turbo-blower receiving the air and gas separated from the water of condensation and serving to raise said air and gas to atmospheric pressure and discharge the same thereto simultaneously with the delivery of the water of condensation to the boiler.

4. The combination, with the return line of a steam or vapor heating system, of a receiver in communication with such return line and receiving water of condensation and air and gas entrained therewith, a turbo-blower in communication with the air space of said receiver, a centrifugal water pump in communication with the water space of said receiver for delivering water of condensation therefrom to the boiler and means for simultaneously driving said turbo-blower and pump.

5. The combination, with the return line of a steam or vapor heating system, of a receiver in communication with such return line and receiving water of condensation and air and gas entrained therewith, a turbo-blower receiving the air and gas from said return line and serving to increase the pressure of the same for discharge to the atmosphere, a centrifugal water pump in communication with said receiver for delivering water of condensation therefrom to the boiler, and means for simultaneously driving said turbo-blower and pump independently of each other.

6. The combination, with the return line of a steam or vapor heating system, of a receiver in communication with such return line and receiving water of condensation, a condenser disposed in advance of said receiver for separating the air and gas entrained with the water of condensation, a centrifugal pump in communication with said receiver for returning the water of condensation collecting therein to the boiler, and a turbo-blower receiving the separated air and gas from the condenser and serving to raise the pressure of such air and gas to that of the atmosphere and discharge the same thereto simultaneously with the delivery of the water of condensation to the boiler.

7. The combination, with the return line of a steam or vapor heating system, of a receiver in communication with such return line and receiving water of condensation and air and gas entrained therewith, a casing mounted above said receiver internally divided into a plurality of annular compartments, a shaft disposed in said chamber, rotors carried by said shaft and disposed in said compartments, a centrifugal water pump in communication with the water space of the receiver, and motor driving means for simultaneously actuating said pump and rotors.

8. The combination, with the return line of a steam or vapor heating system, of a receiver in communication with such return line and receiving water of condensation and air and gas entrained therewith, a casing mounted above said receiver internally divided into a plurality of annular compartments, a shaft horizontally disposed in said chamber, rotors carried by said shaft and disposed in said compartments, a centrifugal water pump in communication with the water space of the receiver, and independent motor drives for simultaneously actuating said pump and rotors.

9. The combination, with the return line of a steam or vapor heating system, of a casing divided into a plurality of chambers; the lower chamber of said casing being in communication with such return main, a vertical shaft mounted in said casing, a centrifugal water pump at the lower end of said shaft, a series of rotors carried by the shaft and disposed in separate compartments in the upper chamber of the casing, and a motor superposed upon said casing for simultaneously driving said rotors and the water pump.

10. The combination, with the return line of a steam or vapor heating system, of a turbo-blower connected to said return line for exhausting vapor and non-condensible gases therefrom and discharging the same to the atmosphere at an increased pressure, means for driving said turbo-blower, and means for carrying off water of condensation accompanying said vapor and non-condensible gases simultaneously with their delivery to the atmosphere.

11. The combination, with the return line of a steam or vapor heating system operating under a vacuum, of a turbo-blower connected to said return line for exhausting vapor and non-condensible gases therefrom and discharging the same to the atmosphere at an increased pressure, means for driving said turbo-blower, and means for carrying off water of condensation accompanying said vapor and non-condensible gases simultaneously with their delivery to the atmosphere.

12. The combination, with the return line of a steam or vapor heating system, of a liquid receiver connected to said return line, a turbo-blower connected to said receiver, means for driving said turbo-blower whereby it may exhaust the vapor and non-condensible gases from said return line and discharge the same to the atmosphere at an increased pressure through said receiver, and means independent of said turbo-blower for simultaneously carrying off water of condensation from said return line accompanying said vapor and non-condensible gases and collecting in said receiver.

13. The combination, with the return line of a steam or vapor heating system, of a turbo-blower connected to said return line, means for driving said turbo-blower whereby it may exhaust the vapor and non-condensible gases from said return line and discharge the same to the atmosphere at an increased pressure, and a centrifugal pump for carrying off water of condensation from said return line simultaneously with the discharge of the entrained gases to the atmosphere.

14. The combination, with the return line of a steam or vapor heating system, of a turbo-blower connected to said return line for exhausting vapor and non-condensible gases therefrom to the atmosphere and comprising a casing having a series of annular compartments, a shaft passing through said compartments and journaled in the ends of said casing, rotors carried by said shaft and disposed in said compartments, a motor drive for said shaft, and a centrifugal pump for carrying off water of condensation from said return line simultaneously with the delivery of the gases to the atmosphere.

15. The combination, with the return line of a steam or vapor heating system operating under a vacuum, of a turbo-blower connected to said return line for exhausting vapor and non-condensible gases therefrom and comprising a casing having a series of annular compartments, a shaft passing through said compartments and journaled in the ends of said casing, rotors carried by said shaft and disposed in said compartments, a motor drive for said shaft, and a motor driven centrifugal pump for carrying off water of condensation from said return line accompanying said vapor and non-condensible gases simultaneously with the discharge of the latter to the atmosphere.

16. The combination, with the return line of a steam or vapor heating system, of a receiver connected with such return line and into which water of condensation and air and gas entrained therewith may pass and wherein separation of such fluids may take place, a casing mounted above said receiver and internally divided into a plurality of annular compartments, a shaft centrally disposed with respect to said compartments and journaled in the ends of said casing, rotors carried by said shaft and disposed in said compartments; said rotors comprising in each instance a disk fastened to the shaft, a series of radial vanes carried by said disk and a second disk supported by said vanes and movable therewith; said rotors being freely movable in the annular compartments and serving to increase the pressure of the entrained air and gas whereby they may be delivered to the atmosphere, means for driving said rotors, and a centrifugal pump for carrying off the water of condensation and delivering the same to the boiler simultaneously with the discharge of the entrained air and gas to the atmosphere.

17. The combination, with the return line of a steam or vapor heating system, of a receiver connected with such return line and into which water of condensation and air and gas entrained therewith may pass and wherein separation of such fluids may take place, a casing mounted above said receiver and internally divided into a plurality of annular compartments, a shaft centrally disposed with respect to said compartments and journaled in the ends of said casing, rotors carried by said shaft and disposed in said compartments; said rotors being freely movable in the annular compartments and serving to increase the pressure of the entrained air and gas whereby they may be delivered to the atmosphere, means for driving said rotors, a centrifugal pump communicating with the water space of said receiver for carrying off the water of condensation simultaneously with the discharge of the entrained air and gas to the atmosphere, and means for driving said pump.

18. The combination, with the return line of a steam or vapor heating system, of a receiver connected with such return line and into which water of condensation and air and gas entrained therewith may pass and wherein separation of such fluids may take place, a turbo-blower communicating with said receiver and serving to discharge the air and gas therefrom to the atmosphere at an increased pressure, a centrifugal pump for removing the water of condensation, and means for simultaneously driving said turbo-blower and pump.

In witness whereof we have signed this specification.

JAMES LOGAN FITTS.
K. W. ROHLIN.